Figure 1:
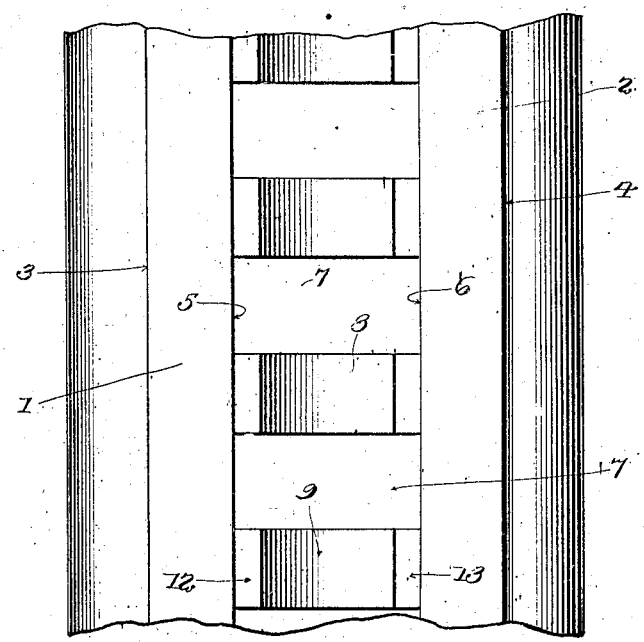

V. K. HOVER.
AUTOMOBILE TIRE.
APPLICATION FILED FEB. 12, 1918.

1,288,415.

Patented Dec. 17, 1918.

UNITED STATES PATENT OFFICE.

VENN K. HOVER, OF FREDONIA, NEW YORK.

AUTOMOBILE-TIRE.

1,288,415.  Specification of Letters Patent.  Patented Dec. 17, 1918.

Application filed February 12, 1918. Serial No. 216,704.

*To all whom it may concern:*

Be it known that I, VENN K. HOVER, a citizen of the United States, residing at Fredonia, in the county of Chautauqua, State of New York, have invented certain new and useful Improvements in Automobile-Tires, of which the following is a description, reference being had to the accompanying drawing and to the figures of reference marked thereon.

The invention relates to new and useful improvements in automobile tires and more particularly to a tire which is constructed so as to prevent skidding.

An object of the invention is to provide an automobile tire wherein the weight carried by the tire is supported on a tread having spaced ribs disposed substantially at the extreme side limits of the traction surface of the tire and wherein the usual high center is avoided.

A further object of the invention is to provide a tire of the above character wherein the outer side walls of the ribs are substantially vertical and wherein the inner side walls are also substantially vertical and the channel between the ribs is provided with spaced cross bars, the extreme height of each bar being less than the height of the adjacent portions of the ribs, so that the weight supported by the tire is carried by the ribs.

These and other objects will in part be obvious and will in part be hereinafter more fully disclosed.

Figure 2:
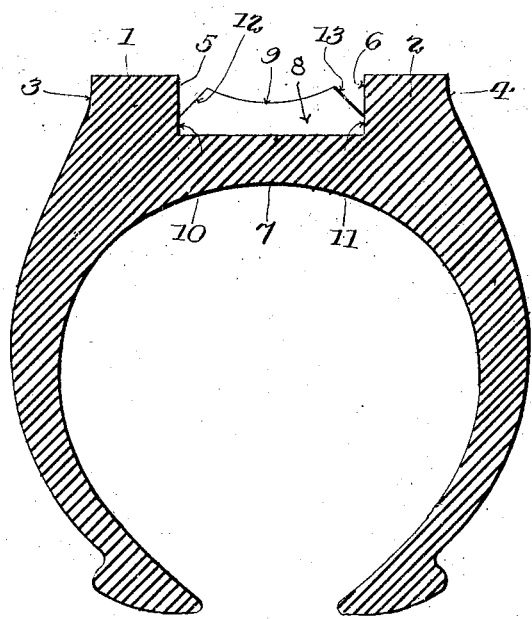

In the drawings which show by way of illustration one embodiment of my invention;

Figure 1 is a plan view of a section of an automobile tire having my improvements embodied therein; and Fig. 2 is a transverse section of the same.

In the drawings I have shown a segment only of the outer casing of a tire. So far as the materials forming the tire are concerned, they may be of the usual construction and I have not illustrated in detail such construction. The invention is directed wholly to the shaping or construction of the tread portion of the tire. This tread portion of the tire is formed with two spaced ribs 1 and 2. The distance from the outer side edge of the rib 1 to the outer side edge of the rib 2 is substantially equal to the surface traction of the tire when under load.

The outer side wall 3 of the rib 1 is substantially vertical, while the outer side wall 4 of the rib 2 is also substantially vertical. The inner side walls 5 and 6 of the ribs 1 and 2 respectively, are likewise vertical. These inner side walls 5 and 6 form the side walls of a channel 7, which extends completely about the central portion of the tire. It is to be noted that the ribs 1 and 2 are continuous and the side walls 3 and 4 are unbroken. Located at spaced intervals in the channel 7 are bars or cross ribs 8. These bars as clearly shown in Fig. 2 are radially within the extreme outer surface of the ribs 1 and 2. The outer edges of the bars or cross ribs 8 as indicated at 9 are slightly curved throughout a portion of the length of the ribs or cross bars. These ribs or cross bars are formed as a part of the ribs 1 and 2 at the points 10 and 11 respectively. The cross bars are also cut away or inclined at 12 and 13 respectively.

By the construction described above, I have provided a tire wherein there is no high center and the entire weight supported by the tire is carried by the ribs 1 and 2. These ribs are spaced a considerable distance and the channel between the ribs is of considerable depth. The depth of this channel will depend upon the size of the tire, but it should be sufficient so that a considerable portion of the road surface will pass into the channel and the inner vertical wall of one or the other of the ribs engaging this portion of the road surface aids in the preventing of skidding. The walls 3 and 4 even when the tire is under load will remain substantially vertical and therefore the tire will present a vertical surface, which when embedded in the road material will effectively prevent the side skidding. The cross bars or cross ribs through engagement with the road material, aid in the grip of the tire on the road material, but these cross ribs are not of sufficient height to interfere in any way with the non-skidding features of the supporting ribs 1 and 2. In other words, the inner side wall of the rib becomes effective to prevent the side slip of the tire. The inclined ends of the bars or cross ribs provide the continuous inner wall, which may engage the road material to accomplish the result stated.

By my improved form of tread the outer wall of one rib and the inner wall of the other rib effectively prevent the side slip of the tire and thus prevent skidding and this is true when the tire is under light load or under heavy load, for the reason that these spaced ribs are disposed at substantially the side limits of the traction surface of the tire.

It is obvious that minor changes in the details of construction may be made without departing from the spirit of the invention as set forth in the appended claims.

Having thus described my invention, what I claim as new and desire to secure by Letters Patent is:—

1. An automobile tire having a tread comprising spaced continuous ribs located substantially at the side limits of the traction surface of the tire, the surface of said tread between said ribs being disposed wholly within the radial extent of the ribs, the outer and inner walls of said ribs being substantially vertical and continuous, and cross bars extending between the ribs, said cross bars at their inner end portions being integral with the ribs, said cross bars having their outer end portions cut away and inclined relative to the ribs so that the inner walls of the ribs are exposed.

2. An automobile tire having a tread comprising spaced continuous ribs located substantially at the side limits of the traction surface of the tire, the surface of said tread between said ribs being disposed wholly within the radial extent of the ribs, the outer and inner walls of said ribs being substantially vertical and continuous, and cross bars extending between the ribs, said cross bars at their inner portions being integral with the ribs, the outer edge of each cross bar being slightly curved throughout a portion of the length thereof and having their outer end portions cut away and inclined relative to the ribs so that the inner walls of the ribs are exposed.

In testimony whereof, I do affix my signature, in the presence of two witnesses.

VENN K. HOVER.

Witnesses:
   JAMES S. PIERCE,
   M. J. PANGBORN.